US009567152B2

(12) United States Patent
Putnam et al.

(10) Patent No.: US 9,567,152 B2
(45) Date of Patent: Feb. 14, 2017

(54) RECLOSABLE WIPER BLADE PACKAGE

(71) Applicants: Kevin Putnam, Pardeeville, WI (US);
Gregg S. Lewis, Middleton, WI (US);
Mike Moulton, Portage, WI (US)

(72) Inventors: Kevin Putnam, Pardeeville, WI (US);
Gregg S. Lewis, Middleton, WI (US);
Mike Moulton, Portage, WI (US)

(73) Assignee: Portage Plastics Corporation, Portage, WI (US)

( * ) Notice: Subject to any disclaimer, the term of this patent is extended or adjusted under 35 U.S.C. 154(b) by 0 days.

(21) Appl. No.: 14/769,337

(22) PCT Filed: Mar. 15, 2014

(86) PCT No.: PCT/US2014/030064
§ 371 (c)(1),
(2) Date: Aug. 20, 2015

(87) PCT Pub. No.: WO2014/145324
PCT Pub. Date: Sep. 18, 2014

(65) Prior Publication Data
US 2016/0001966 A1    Jan. 7, 2016

Related U.S. Application Data

(60) Provisional application No. 61/799,036, filed on Mar. 15, 2013.

(51) Int. Cl.
*B65D 85/00* (2006.01)
*B65D 75/22* (2006.01)
(Continued)

(52) U.S. Cl.
CPC ............... *B65D 85/54* (2013.01); *B60S 1/38* (2013.01); *B65D 75/22* (2013.01); *B65D 77/26* (2013.01);
(Continued)

(58) Field of Classification Search
CPC ... B60S 1/38; B60S 1/3848; B60S 2001/3825; B60S 2001/3898; B65D 5/44; B65D 5/445; B65D 5/50; B65D 5/5076; B65D 25/10; B65D 25/107; B65D 43/16; B65D 43/162; B65D 75/22; B65D 77/26; B65D 77/30; B65D 81/05; B65D 81/058; B65D 85/00; B65D 85/54; B65D 85/68; B65D 2585/688
(Continued)

(56) References Cited
U.S. PATENT DOCUMENTS 7,527,151 B2 *  5/2009  Park ................. B65D 25/10
                                                    206/335
8,042,690 B2 * 10/2011  Lewis ............... B65D 43/162
                                                    206/470
(Continued)

FOREIGN PATENT DOCUMENTS

JP      2008239249      10/2008

*Primary Examiner* — Bryon Gehman
(74) *Attorney, Agent, or Firm* — Boyle Fredrickson S.C.

(57) ABSTRACT

A reclosable wiper blade package for holding a beam-type wiper blade having a wiper blade adapter-receiving cradle of a blade receiving cavity formed in one of a pair of package halves that is configured for snap fit engagement with an adapter of the wiper blade releasably retained in the blade receiving cavity. The cradle can also be configured to locate and orient arms of the wiper blade so they engage a corresponding blade arm seat in a substantially straightened condition orienting the blade on its side. One or both package halves are formed with elongate ribs that can define package sidewalls that can even form at least part of the blade receiving cavity that can have spaced apart rib-strengthening gussets where rib width is narrowed or constricted.

34 Claims, 8 Drawing Sheets

(51) Int. Cl.
  *B65D 85/68* (2006.01)
  *B60S 1/38* (2006.01)
  *B65D 77/26* (2006.01)
  *B65D 77/30* (2006.01)

(52) U.S. Cl.
  CPC .............. *B65D 77/30* (2013.01); *B65D 85/68* (2013.01); *B60S 2001/3825* (2013.01); *B65D 2585/6885* (2013.01)

(58) Field of Classification Search
  USPC ................................ 206/335, 349, 470, 471
  See application file for complete search history.

(56) References Cited

U.S. PATENT DOCUMENTS

| | | | | |
|---|---|---|---|---|
| 8,505,724 | B2* | 8/2013 | Bult | B65D 75/22 |
| | | | | 206/470 |
| 8,613,357 | B2* | 12/2013 | Putnam | B65D 43/162 |
| | | | | 206/335 |
| 8,910,789 | B2* | 12/2014 | Lewis | B65D 43/162 |
| | | | | 206/470 |
| 9,045,256 | B2* | 6/2015 | Baker | B65D 25/10 |
| 9,139,347 | B2* | 9/2015 | Lewis | B65D 43/162 |
| 2005/0252812 | A1 | 11/2005 | Lewis | |
| 2007/0235362 | A1 | 10/2007 | Lewis | |
| 2010/0307940 | A1 | 12/2010 | Kim | |
| 2012/0103852 | A1 | 5/2012 | Putnam | |

\* cited by examiner

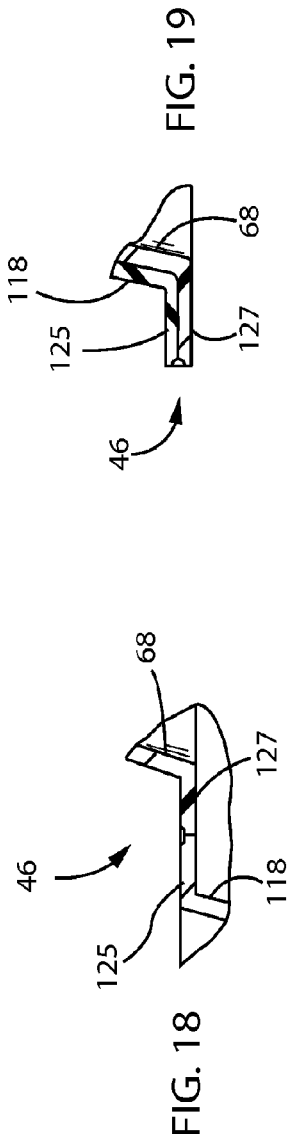
FIG. 18
FIG. 19
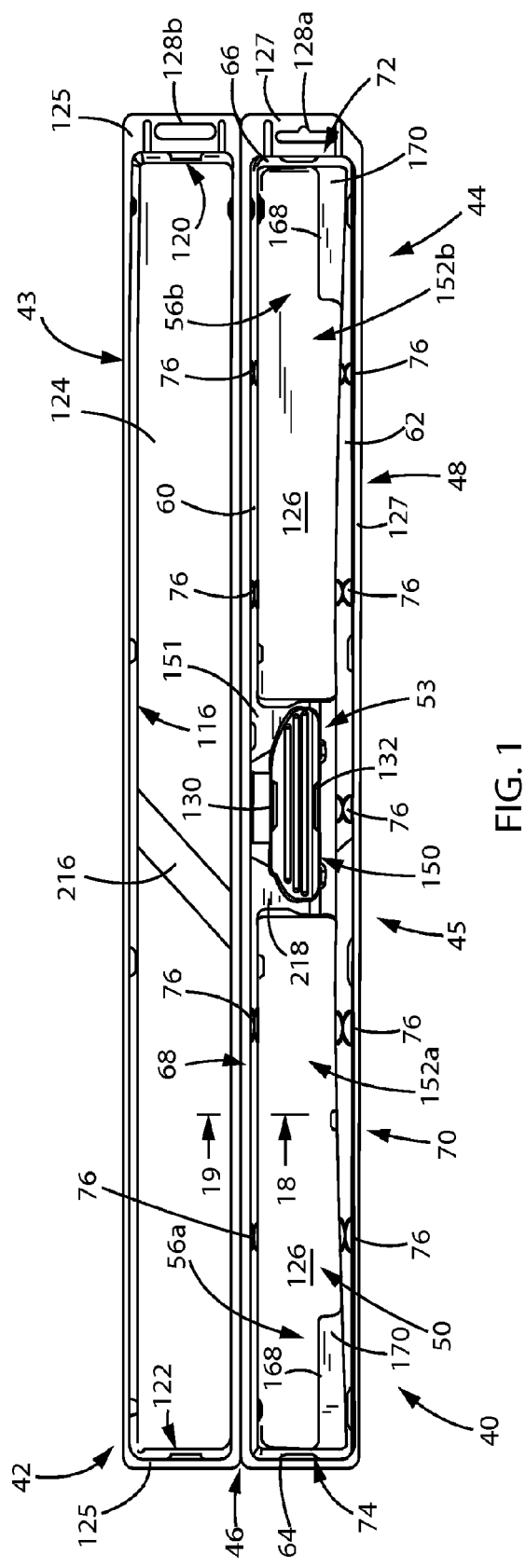
FIG. 1

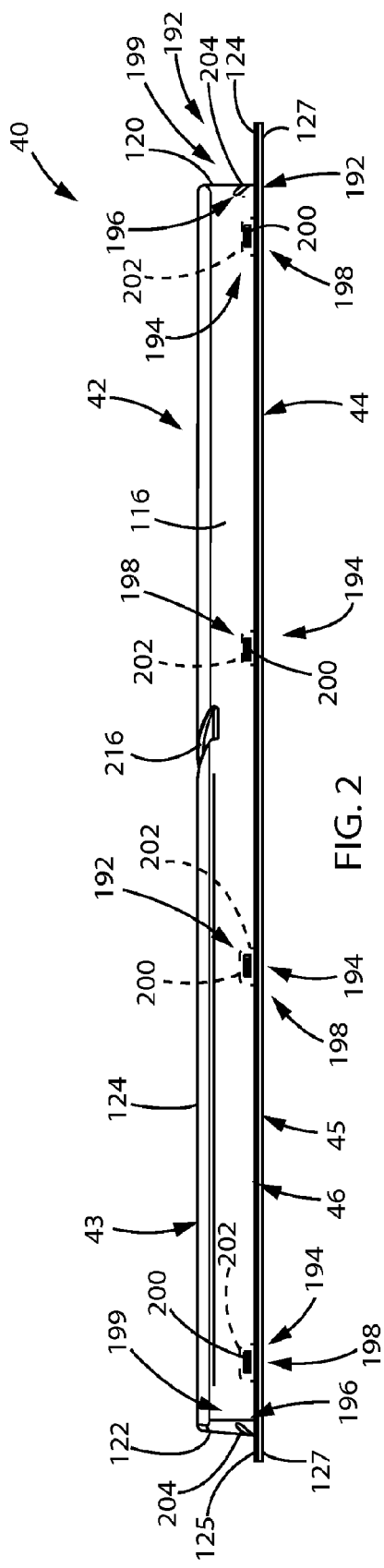
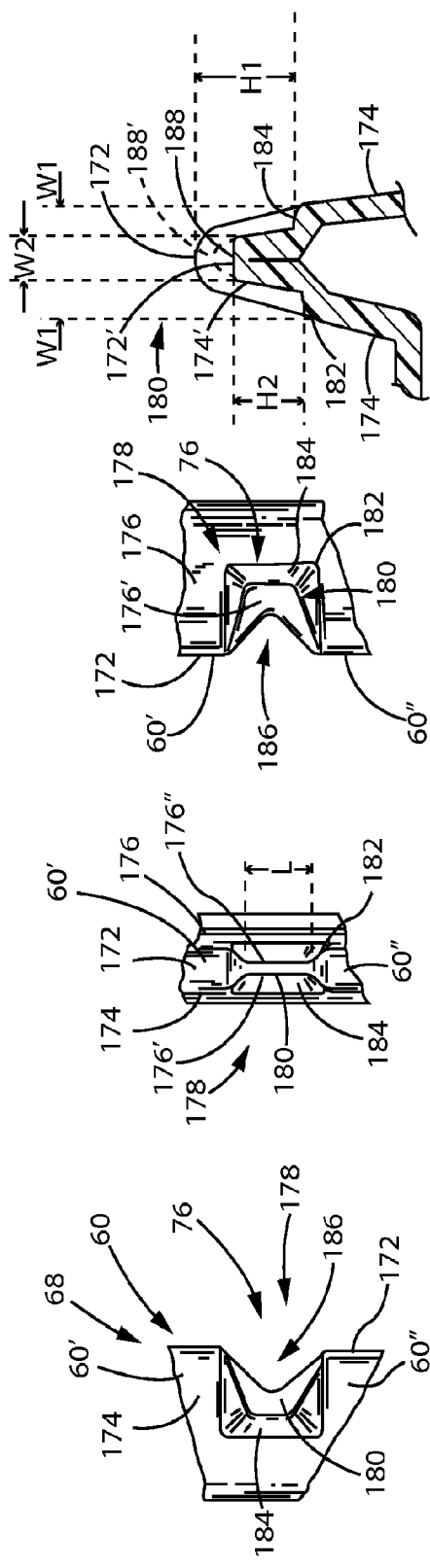

RECLOSABLE WIPER BLADE PACKAGE

CROSS-REFERENCE

This application claims a benefit of priority on patent U.S. Application No. 61/799,036, filed Mar. 15, 2013, the entire contents of which are hereby expressly incorporated by reference into the present application.

FIELD

The present invention relates generally to packaging material. In particular, the present invention relates to a reclosable wiper blade package for packaging pre-curved beam type wiper blades.

BACKGROUND

Pre-curved beam-type windshield or windscreen wiper blades continue to grow in popularity throughout the United States and the world. Beam-type wiper blades have an elongate beam, typically made of a relatively thin generally rectangular strip of metal, which is substantially continuously curved during manufacture to impart a corresponding substantially continuous curve to an elastomeric, e.g., rubber, wiping element extending outwardly from the beam. Imparting such a substantially continuous curve to the wiping element causes the wiping element to make more uniform contact with a vehicle windshield or windscreen during wiper operation improving the squeegee action of the wiper blade.

Pre-curved beam-type wiper blades offer significant improvement over other types of wiper blades including infinite pressure points offer uniform contact, lower profile which minimizes view obstruction, improved aerodynamics with less windlift, and they are specifically engineered for highly curved windshields. Overall, pre-curved beam-type wiper blades maximum performance and durability in all weather conditions.

Numerous challenges have been encountered in making packages that hold pre-curved beam-type wiper blades. One challenge resulted from the pre-curve of beam-type wiper blades having a greater transverse width than previous conventional articulating framework wiper blades. To minimize package volume and maximize retail display package density, thermoformed reclosable packages have been produced that hold pre-curved beam-type wiper blades in a partially or substantially straightened condition. These packages have a cover for covering a blade-holding cavity formed in a blade-retaining package panel configured to receive the beam-type wiper blade.

Another challenge relates to protecting the wiping element while in the package. Due to the curvature of the beam and the relatively fragile nature of the rubber wiping element, the wiping element can become warped or distorted if it comes into contact with the. When this happens, the outer tip or squeegee edge of the wiping element may be unable to make substantially continuous contact with a vehicle windshield when the wiper blade is installed, causing streaking to occur during operation. Another challenge relates to keeping the beam-type wiper blade in a fixed position while in the package without applying pressure to the wiping element. Should either of these occur with a brand new beam-type wiper blade taken right out of the package, customer expectations are not met which can also adversely affect future wiper blade purchasing decisions.

Yet another challenge in beam-type wiper blade packaging is lowering manufacturing costs by forming the package with as little material as possible while still providing a sturdy structure capable of retaining the beam-type wiper blade in a fixed position while in the package without applying pressure to the wiping element.

While known reclosable wiper blade packages have enjoyed substantial commercial success, improvements nonetheless remain desirable. For example, achieving the desired draw ratio of the blade-holding cavity can be a challenge, particularly with narrower beam-type wiper blades. Even where the desired draw ratio can be achieved, it can still be desirable to provide greater clearance between the wiping element and the package to help prevent contact therebetween.

What is therefore needed is an improved reclosable wiper blade package that better protects the wiping element of a beam-type wiper blade by providing greater clearance between the wiping element and the package. What is also needed is a reclosable wiper blade package that is particularly well suited for narrower beam-type wiper. What is also needed is a package design capable of providing adequate structural rigidity while still minimizing the thickness of the package.

SUMMARY

By way of summary, the present invention is directed to a reclosable wiper blade package and a wiper blade. The wiper blade may include an elongate pre-curved beam-blade wiper blade having a pair of elongate blade arms extending oppositely outwardly from a wiper blade mounting adapter.

A blade-retaining package panel, or cradle, may be formed to provide snap-fit engagement with the adapter when the wiper blade is received in the blade-receiving cavity thus releasably retaining the wiper blade in the blade-receiving cavity.

The reclosable wiper blade package may be formed of a pair of package halves joined by a hinge with one of the package halves comprising a cover and the other one of the package halves comprising a blade-retaining package panel having a blade-receiving cavity formed therein configured to receive and releasably retain the wiper blade.

The wiper blade may include an elongate flexible wiping element extending outwardly from the blade arms substantially the length of the wiper blade from at or adjacent a free end of one of the blade arms to at or adjacent a free end of the other one of the blade arms. In order to attach the wiper blade to a vehicle's windscreen, an adapter is attached to the wiper blade.

The elongate flexible wiping element may also include an elongate outer squeegee edge. The blade-receiving cavity may be configured to receive and releasably retain the wiper blade sideways, in a substantially straightened condition, with the outer wiping element tip extending outwardly away from the hinge when the adapter of the wiper blade is disposed in snap-fit engagement with the blade-retaining package panel. The wiper blade may be releasably retained in the substantially straightened condition when the wiper blade is received in the blade-receiving cavity with each wiper blade arm seated on a blade arm-receiving platform for each wiper blade arm. In this configuration, the blade arm abutment is generally planar and generally parallel with part of the blade arm in abutment therewith when part of the corresponding blade arm is seated on the blade arm-receiving platform.

The blade-retaining package panel may also include a pair of oppositely extending adapter-retainer fingers formed therein. The adapter fingers may be configured to extend outwardly toward one another releasably capturing the adapter therebetween when the wiper blade is received in the blade receiving cavity releasably, thus retaining the wiper blade in the cavity. The adapter may have a top configured for mounting to a reciprocating vehicle windshield wiper arm and a bottom from which the pair of elongate blade arms oppositely outwardly extend. One of the adapter-retainer fingers may engage the top of the adapter and the other one of the adapter-retainer fingers may engage the bottom of the adapter when the wiper blade is received in the blade-receiving cavity.

As mentioned above, the wiper blade may be disposed in a substantially straightened condition when received in the blade-receiving cavity with the adapter of the wiper blade releasably captured between the adapter retainer fingers, thus releasably retaining the wiper blade in the blade-receiving cavity. Stated in other words, the wiper blade may be received in the blade-receiving cavity disposed on a side of the wiper blade when received in the blade-receiving cavity. The adapter of the wiper blade may then be releasably captured between the adapter retainer fingers, thus releasably retaining the wiper blade in the blade-receiving cavity.

The blade-retainer fingers provide snap-fit engagement with the adapter when releasably captured between the blade-retainer fingers. Stated in other words, the adapter may have a top configured for mounting to a reciprocating vehicle windshield wiper arm with the adapter top having a top recess formed therein and a bottom from which the pair of elongate blade arms oppositely outwardly extend with the adapter bottom having a bottom recess formed. Also, one of the adapter-retainer fingers may be received in the top recess formed in the top of the adapter and the other one of the adapter-retainer fingers is received in the bottom recess formed in the bottom of the adapter when the wiper blade is received in the blade-receiving cavity and the adapter releasably captured between the adapter-retainer fingers.

As previously mentioned, the adapter cradle may be formed in the blade-retaining package panel. The cradle may have a pair of oppositely outwardly and longitudinally extending blade arm locator channels which each receive part of a corresponding blade arm adjacent the adapter of the wiper blade when the adapter is received in the adapter cradle. This orients the blade arms longitudinally within a respective longitudinally extending elongate blade-arm receiving chamber of the blade-receiving cavity in communication with the blade arm locator channel. Each blade arm locator channel may be wider in width than the respective blade arm received therein but narrower in width than the corresponding blade arm receiving chamber in communication therewith.

Also previously stated, the wiper blade has an elongate flexible wiping element extending outwardly from the blade arms substantially the length of the wiper blade from at or adjacent a free end of one of the blade arms to at or adjacent a free end of the other one of the blade arms with the wiping element having an elongate squeegee edge. Each blade arm receiving chamber of the blade-receiving cavity has an upraised blade arm-receiving platform with a blade arm abutment against which part of the respective blade arm is received in the corresponding blade arm receiving chamber abuts and a wiping element support upon which part of the wiping element of the respective blade arm received in the corresponding blade arm receiving chamber rests. The wiper blade may be releasably retained in a substantially straightened condition when the adapter of the wiper blade is received in the adapter cradle and each wiper blade arm is received in a corresponding blade arm locator channel and seated against a respective blade arm-receiving platform. Also, each blade arm-receiving platform is generally right angled with the blade arm abutment disposed generally perpendicular to the wiping element support.

Stated in other words, the wiper blade may have an elongate flexible wiping element extending outwardly from the blade arms substantially the length of the wiper blade from at or adjacent a free end of one of the blade arms to at or adjacent a free end of the other one of the blade arms. The wiping element may have an elongate squeegee edge, while the blade-receiving cavity may have a pair of oppositely spaced apart upraised blade arm-receiving platforms each having a blade arm abutment against which part of a respective blade arm abuts and a wiping element support upon which part of the wiping element of a respective blade arm rests.

The blade-retaining package panel may include an elongate rib formed therein with the rib having both a pair of spaced apart rib sidewalls extending outwardly from a rib endwall as well as a plurality of longitudinally spaced apart rib strengthening gusset integrally formed of an adjacent portion of the rib sidewalls extending transversely therebetween. Each rib gusset is shaped such that it forms a recess in the rib endwall. Each rib gusset also forms a generally V-shaped or U-shaped notch in the rib endwall. The V-shape may also include a generally V-shaped transverse cross-section.

Each rib gusset also comprises a constricted portion of the rib having a transverse cross-sectional width less than the width of the rib. The constricted portion of the rib forming each rib gusset may include a segment of the rib where the rib sidewalls are not spaced apart and/or are pinched together. This may be done to each rib gusset such that a segment of the rib sidewalls are plastically deformed together. The longitudinally spaced apart longitudinally extending gussets may be integrally formed of a segment of the rib sidewalls in contact with one another producing a constriction in the rib having a transverse width less than the width of the rib on either side of the gusset. The elongate rib with gussets also extends longitudinally along one side of the blade-receiving cavity and is generally parallel to the hinge. The elongate rib with gussets additionally forms a sidewall of the blade-receiving cavity integrally formed in the blade-retaining package panel.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DRAWING DESCRIPTION

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1 illustrates a top view of an empty reclosable wiper blade package in an open position;

FIG. 2 illustrates a side view of the empty reclosable wiper blade package according to FIG. 1, in a closed position;

FIG. 10 illustrates a partial close up side view of a gusset of the reclosable wiper blade package;

FIG. 11 illustrates a partial close up top view of a gusset of the reclosable wiper blade package;

FIG. 12 illustrates a partial close up side view of a gusset, opposite of FIG. 3*b*, of the reclosable wiper blade package;

FIG. 13 illustrates a cross sectional view of the gusset according to FIG. 11 along line 13:13;

FIG. 18 illustrates a cross sectional view of a hinge portion of the reclosable wiper blade package according to FIG. 1 along line 18:18.

FIG. 19 illustrates a cross sectional view of the hinge portion of the reclosable wiper blade package according to FIG. 18 with the wiper blade package in a closed position.

Figure 3:
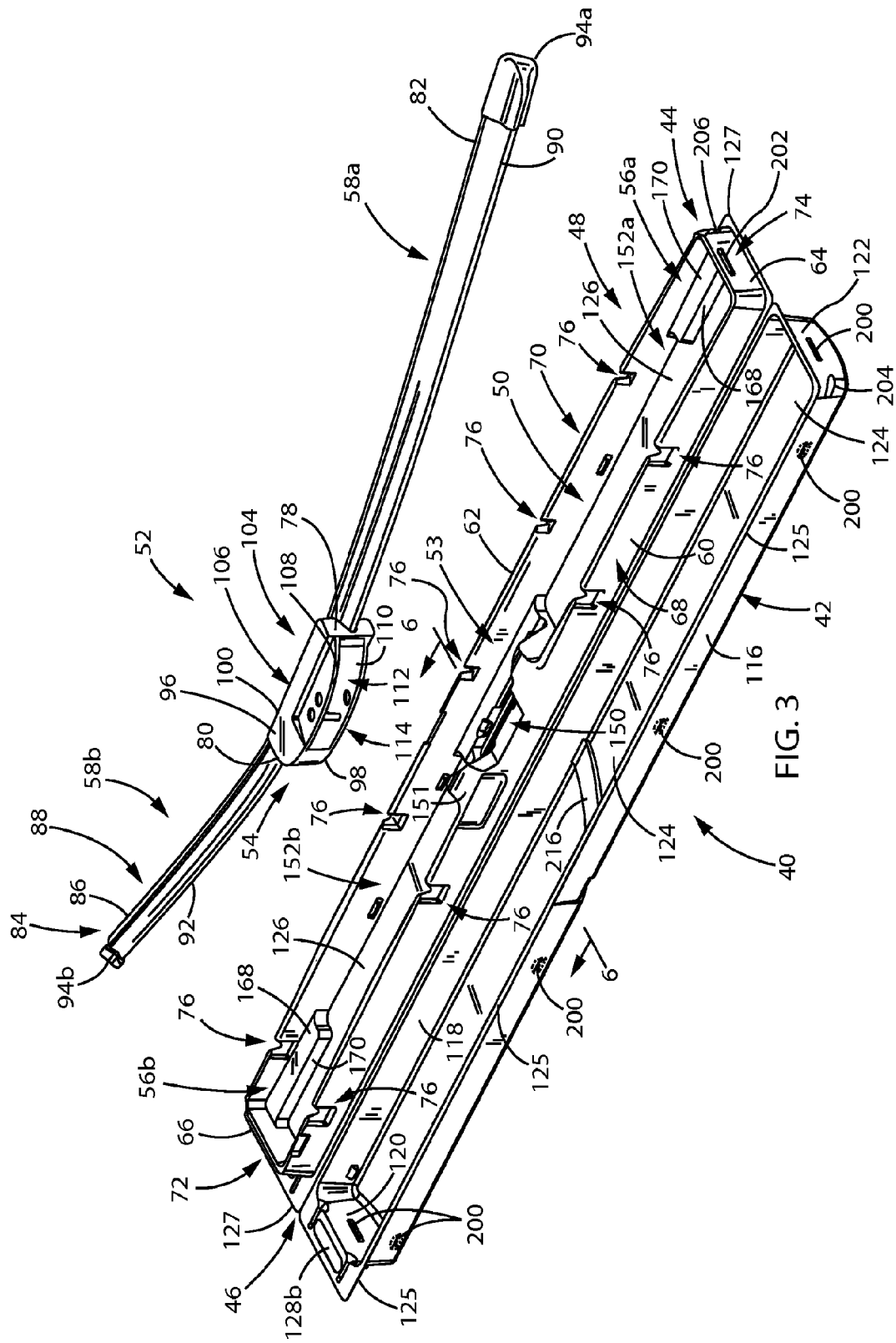
FIG. 3 illustrates a perspective view of the empty reclosable wiper blade package in an open position according to FIG. 1 with a wiper blade in a substantially pre curved position proximate the reclosable wiper blade package.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

Figure 4:
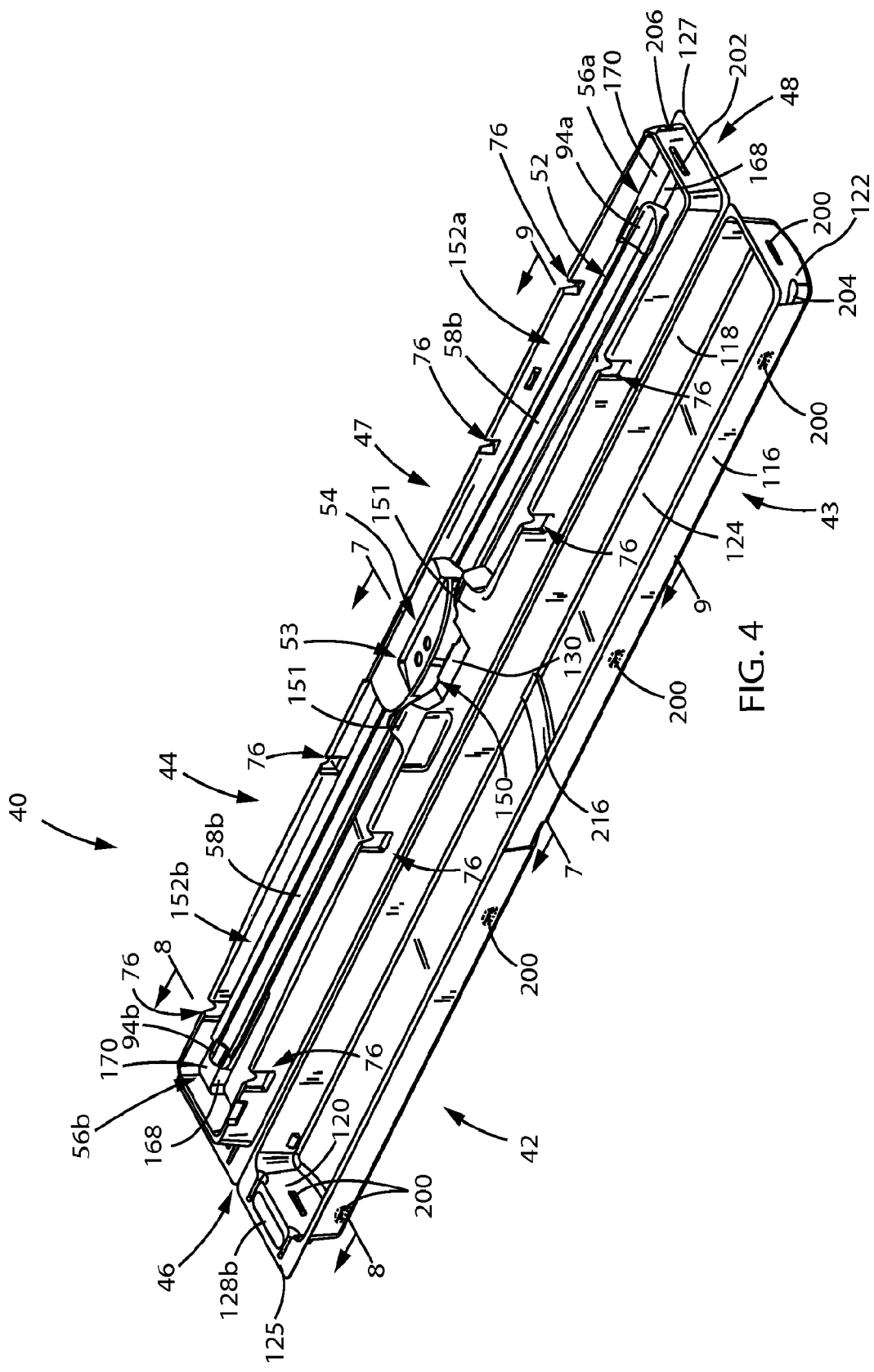
FIG. 4 illustrates a perspective view of a reclosable wiper blade package in an open position according to FIG. 1 with a wiper blade in a substantially straightened position inserted in the blade-retaining package panel of the reclosable wiper blade package.
Figure 5:
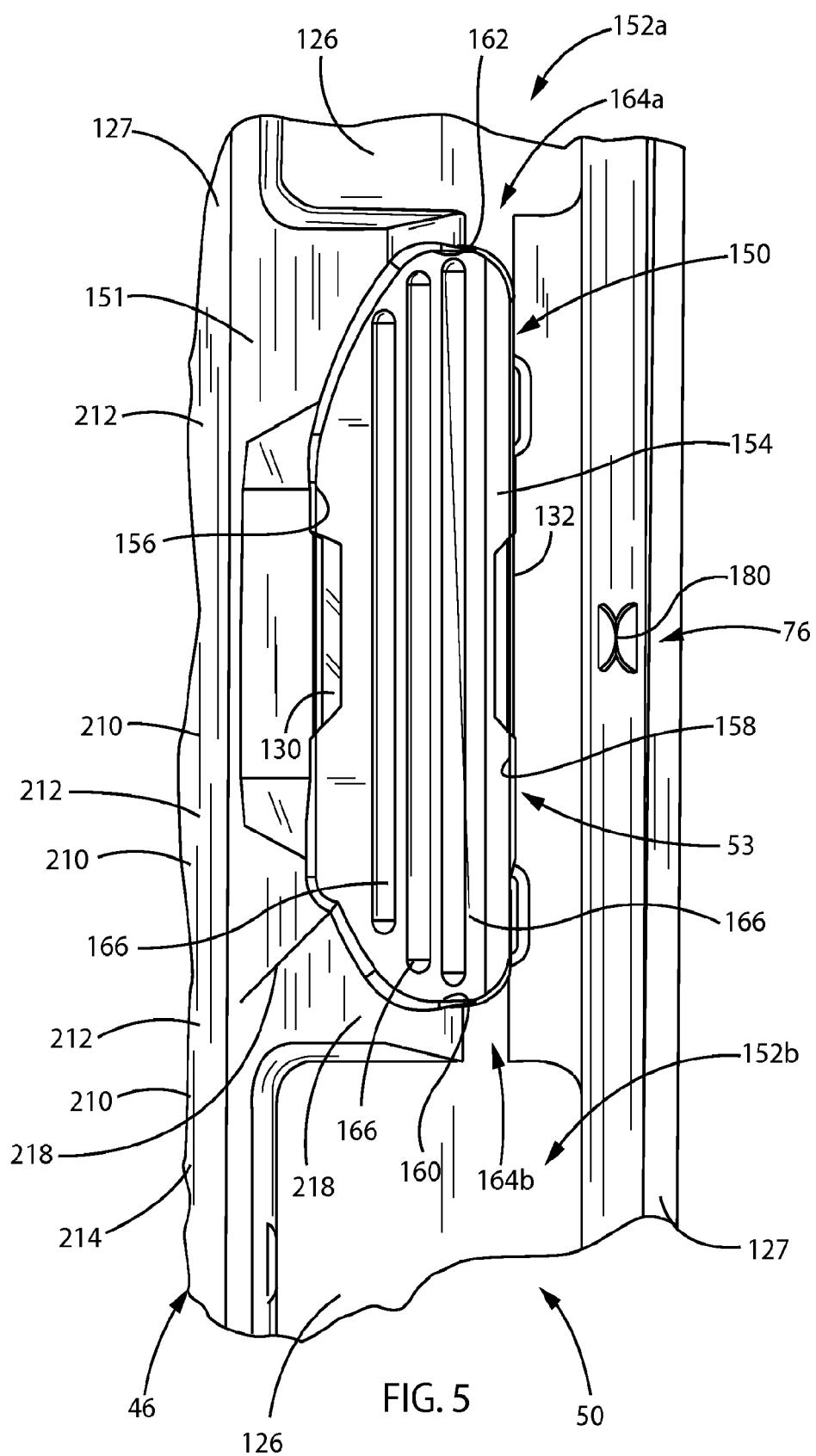
FIG. 5 illustrates a partial close up top view of a an adapter cradle of the reclosable wiper blade package.

FIGS. 1-9 illustrate a reclosable wiper blade package 40 constructed in accordance with the present invention having a pair of package halves 42, 44 joined by a hinge 46 with one of the package halves 42 defining a package cover 43 and the other one of the package halves 44 defining a blade holding package base 48 having a wiper blade receiving cavity 50 formed therein that is configured for receiving and releasably retaining a pre-curved beam-type wiper blade 52 (FIGS. 3 and 4) in a substantially straightened condition. As is best depicted by FIGS. 3-5, the wiper blade receiving cavity 50 includes an adapter cradle 53 configured to releasably retain an adapter 54 of the wiper blade 52 and a pair of spaced apart wiper blade arm seats 56*a*, 56*b* on opposite sides of the adapter cradle 53 that each provide a seat for a corresponding one of a pair of blade arms 58*a*, 58*b* of the wiper blade 52 that extend outwardly in opposite directions from the adapter 54. One or both package halves 42, 44 can be formed like package half 44 having one or more elongate ribs 60, 62, 64, 66 that can define one or more corresponding walls 68, 70, 72, 74 that each can include one or more rib-narrowing gussets 76 formed therein that not only strengthen each rib 60, 64 in which such gussets 76 are formed but also the corresponding walls 68, 70 thereby strengthening not only the respective package half 44 but also the package 40, including particularly when the package 40 is closed.

With reference to FIGS. 2, 4, 7, 8 and 9, the wiper blade 52 is an elongate pre-curved beam-type or beam-blade wiper blade 52 having a pair of elongate longitudinally extending blade arms 58*a*, 58*b* extending oppositely outwardly from a corresponding endwall 78, 80 of the adapter 54. The blade arms 58*a*, 58*b* are formed of an elongate longitudinally extending pre-formed or pre-curved beam 82 from which an elongate longitudinally extending flexible elastomeric wiping element 84 outwardly extends in one direction that has a narrowed outer squeegee edge or tip 86 defining a windscreen or windshield wiping squeegee 88. The wiper blade 52 can have an elongate longitudinally extending outer blade arm cover 90 on each blade arm 58*a*, 58*b* that can be in the form of an airfoil 92 extending outwardly from the beam 82 in a direction opposite the squeegee 88. If desired, the end of each blade arm 58*a*, 58*b* can be covered by an end cap 94*a*, 94*b*. The adapter 54 has a pair of spaced apart longitudinally extending sidewalls 96, 98 extending between the adapter endwalls 78, 80 with each adapter sidewall 96, 98 having a respective bottom edge 100, 102 straddling opposite sides of the beam 82 which is disposed in a bottom recess 104 formed in a bottom 106 of the adapter 54. Each adapter sidewall 96, 98 has a corresponding top edge 108, 110 extending alongside or adjacent a top recess 112 formed in a top 114 of the adapter 54 that forms a wiper arm receptacle 112 in which a free end of a reciprocable vehicle windshield or windscreen wiper arm (not shown) is received in attaching the wiper blade 52 thereto.

Figure 8:
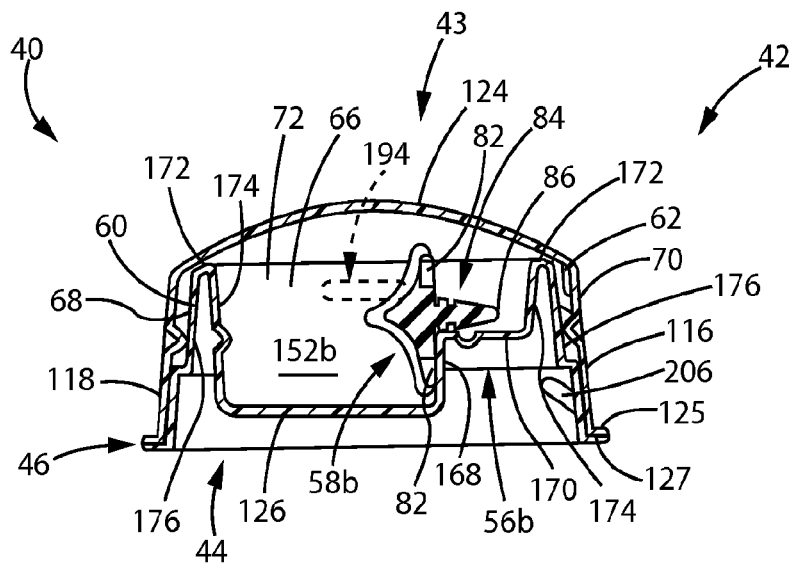
FIG. 8 illustrates a cross sectional view of the reclosable wiper blade package according to FIG. 4, with the cover in a closed position, with a wiper blade in a substantially straightened position inserted in the blade-retaining package panel of the reclosable wiper blade package along line 8:8.
Figure 9:
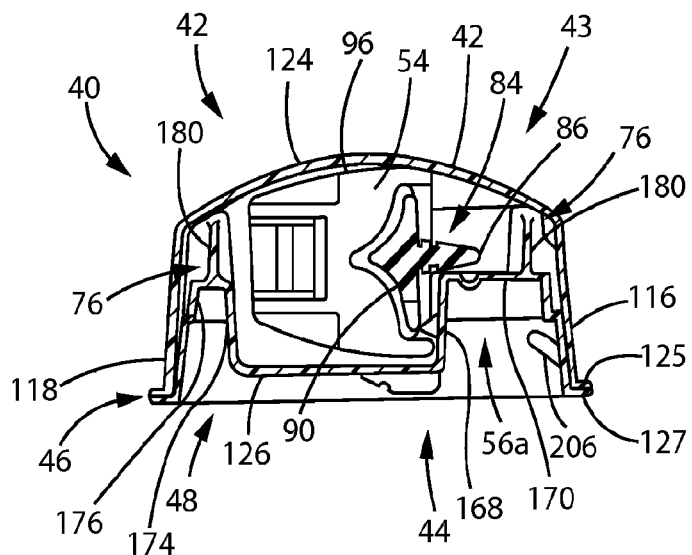
FIG. 9 illustrates a cross sectional view of the reclosable wiper blade package according to FIG. 4, with the cover in a closed position, with a wiper blade in a substantially straightened position inserted in the blade-retaining package panel of the reclosable wiper blade package along line 9:9.
Figure 14:
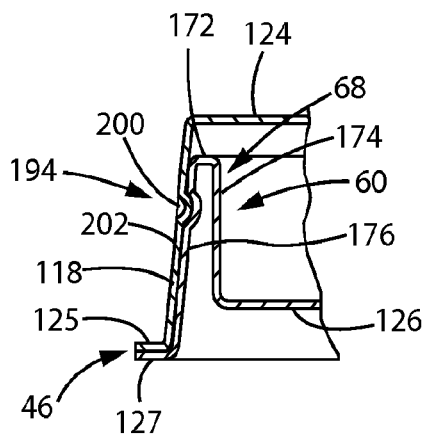
FIG. 14 illustrates a partial, close up, cross sectional view of a corner of the reclosable wiper blade package according to FIG. 16, with the cover in a closed position, with a wiper blade in a substantially straightened position inserted in the blade-retaining package panel of the reclosable wiper blade package along line 14:14.

The reclosable wiper blade package 40 is shown in an open position in FIGS. 1, 3, 4 and 6 and in a closed position in FIGS. 2, 8 and 9. The wiper blade package 40 includes a first package half 42, herein referred to as the cover 43, and a second package half 44, herein referred to as a wiper blade retaining package panel 47 that is three-dimensionally formed in the package base 48. The wiper blade package 40 may be formed using any one of a number of suitable manufacturing methods, but preferably is vacuum thermal formed, e.g., thermoformed, of a relatively thin sheet of polyester resin, such as polyethylene terephthalate, commonly referred to as PET. Other plastics, such as polyvinyl chloride, polyethylene tetraglycol (PETG), a styrene, a K-resin, or the like can also be used to form a package 40 constructed in accordance with the present invention. Such a plastic sheet is relatively thin, having a thickness of between 0.0075 inches and 0.075 inches, with a typical thickness ranging between about 0.08 and about 0.070 inches, preferably on the order of about 0.010 inches, producing a relatively clear or see-through package 40 having a corresponding thickness when thermoformed.

The cover 43 preferably is elongate and generally rectangular. The cover 43 can and preferably does include a pair of spaced apart longitudinally extending elongate sidewalls 116, 118 defining generally parallel cover sides, a pair of spaced apart generally transversely extending end walls 120, 122 defining a top and bottom of the cover 43, and an outer cover wall 124 extending therebetween that overlies the blade receiving cavity 50 and wiper blade 52 when the package 40 is closed. The cover 43 includes a substantially flat cover flange 125 extending outwardly about the perimeter of the cover 43. Where the cover 43 includes sidewalls 116, 118 and endwalls 120, 122, the cover flange 125 can extend outwardly from each of the cover sidewalls 116, 118 and the cover endwalls 120, 122 such as is shown in FIGS. 1-4.

The package base 48 and the blade retaining package panel 47 can be and preferably are also elongate and generally rectangular. The blade retaining package panel 47 includes a pair of spaced apart longitudinally extending elongate sidewalls 68, 70 that can and preferably do define generally parallel panel sides, a pair of spaced apart generally transversely extending endwalls 72, 74 that can and preferably do define a top and bottom of the panel 47, and a panel floor 126 extending therebetween, at least a portion of which can be generally planar as depicted in FIGS. 1 and 3. The panel sidewalls 68, 70 and the panel endwalls 72, 74 can, along with the panel floor 126, define at least portions of corresponding sides and ends of the wiper blade receiving cavity 50 as also shown in FIGS. 1 and 3.

Like the cover 43, the blade retaining package panel 47 has a blade retaining package panel flange 127 that extends outwardly about the perimeter of the panel 47. As is best shown in FIGS. 1-9, the panel flange 127 extends outwardly from the panel sidewalls 68, 70 and panel endwalls 72, 74 with the panel sidewalls and endwalls 68, 70, 72, 74 nesting within corresponding cover sidewalls and endwalls 116, 118, 120, 122 with the flanges 125, 127 overlapping one another when the package 40 is closed as depicted in FIGS. 2, 8 and 9.

Formed in or adjacent one end, e.g., a top end, of both the cover flange 125 and panel flange 127 is a hanger hole 128*a*, 128*b*. When the wiper blade package 20 is closed, the flanges 125, 127 overlap one another such that the hanger holes 128*a*, 128*b* in each flange 125, 127 line up to one another allowing the wiper blade package 20 to be hung on a hook (not shown) of a retail display or the like.

The wiper blade package 40 is designed to hold the pre-curved beam type wiper blade 52 in the blade receiving cavity 50 of the blade retaining package panel 47 three dimensionally formed in the package base 48 in a substantially straightened condition like that shown in FIG. 4. Such pre-curved beam type wiper blades commonly include an adapter 54 in the central location of the wiper blade 52. The adapter 54 allows the wiper blade 52 to be removably attached to a wiper arm of a vehicle (not shown). The pre-curvature of the beam 82 creates added pressure pushing a wiping edge 86 of its squeegee 88 against a windshield or windscreen (not shown) of a vehicle (also not shown), e.g., automotive vehicle, allowing it to more effectively remove water. The squeegee 88 is formed with a wiping edge 86 of a flexible material such as rubber or silicone. In order to remain optimally effective, at least the wiping edge or tip 86 of the squeegee 88 must be prevented from experiencing any pressure or deformation while it is stored in the wiper blade package 40 for an extended period of time within the package 40 during transportation, warehousing, or while remaining on display in a retail store. Additionally, it is also desirable that the wiper blade package 40 be generally rectangular in shape allowing better stacking for storage and fitting a greater number of wiper blade packages 40 in boxes for shipping purposes.

As a result, the wiper blade package 40 is configured to retain such a pre-curved beam-type wiper blade 52 in a substantially straightened condition in a generally rectangular shaped reclosable package in a manner that prevents contact between the package 40 and the wiping edge or tip 86 of a squeegee 88 of a wiper blade 52 held in the closed package 40. As shown best in FIGS. 3-7, this is accomplished with a three dimensionally formed wiper blade receiving cavity 50 that is configured for receiving and releasably retaining a pre-curved beam-type wiper blade 52 in a substantially straightened condition while keeping the wiping edge or tip 86 of the squeegee 88 of a wiper blade 52 from contacting any part of the reclosable package 40 while received in the cavity 50, including while the package 40 is closed. In the preferred reclosable wiper blade package embodiment shown in the drawing figures, the wiper blade receiving cavity 50 is three dimensionally formed in a manner that receives and releasably retains such a pre-curved beam-type wiper blade substantially straightened in a sideways wiper blade orientation with the wiping edge or tip 86 of the squeegee 88 extending generally horizontally transversely relative to the package hinge 46 in a direction generally facing away from the hinge 46.

With continued reference to FIGS. 3-7, the adapter cradle 53 is formed in the blade retaining package panel 47 in a manner that not only receives and releasably retains the adapter 54 of a pre-curved beam-type wiper blade 52 being inserted into the wiper blade receiving cavity 50, but which also helps orient the wiper blade 52 sideways within the cavity 50. The adapter cradle 53 preferably is configured to provide at least frictional engagement that can be elastically deflecting engagement between part of the blade retaining package panel 47 forming the cradle 53 and the wiper blade adapter 54 to positively yet releasably retain the adapter 54 in the cradle 53. In a preferred embodiment, the adapter cradle 53 is configured to provide snap fit engagement with spaced apart portions of the wiper blade adapter 54 with a preferred cradle embodiment configured to provide snap fit engagement with oppositely located portions of the adapter 54.

Figure 6:
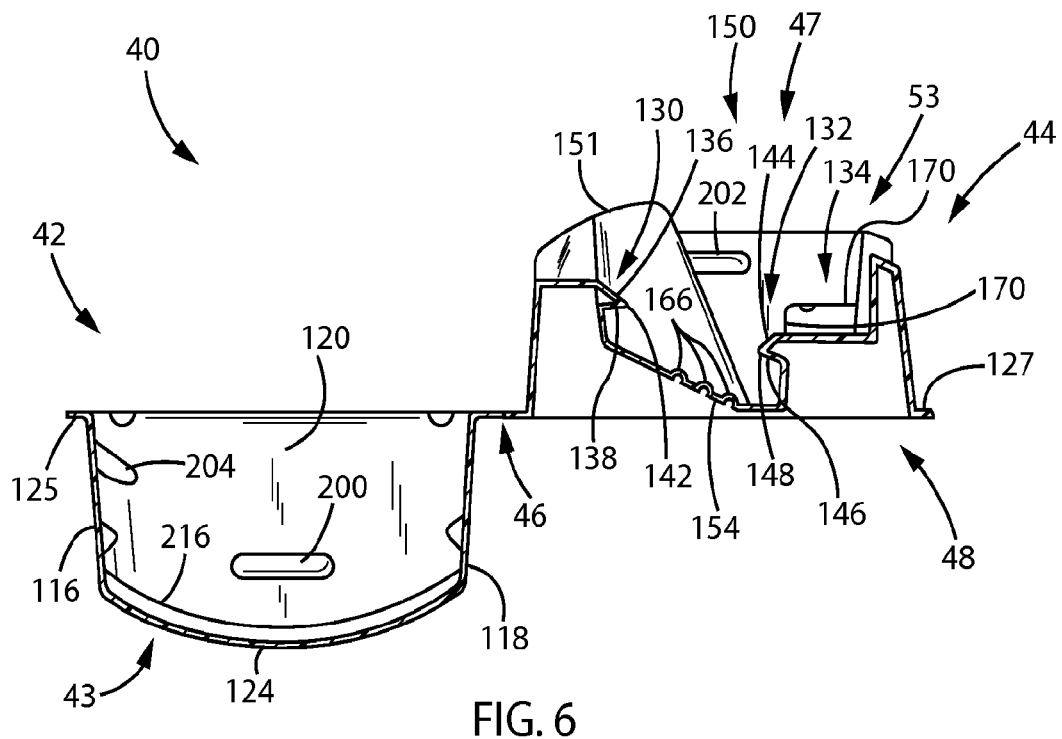
FIG. 6 illustrates an cross sectional view of the empty reclosable wiper blade package according to FIG. 3 along line 6:6.
Figure 7:
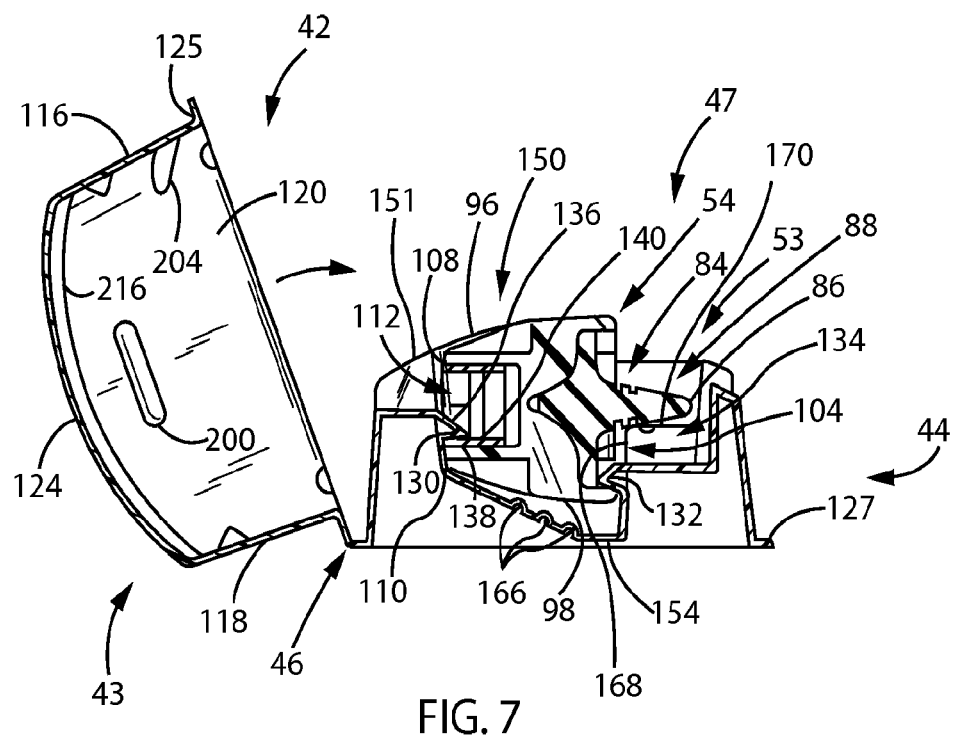
FIG. 7 illustrates a cross sectional view of the reclosable wiper blade package according to FIG. 4, with the cover in a partially pivoted position, with a wiper blade in a substantially straightened position inserted in the blade-retaining package panel of the reclosable wiper blade package along line 7:7.

With specific reference to FIGS. 5-7, the adapter cradle 53 includes a pair of opposed adapter retention fingers 130, 132 generally facing each other that are spaced apart by a distance less than the adapter 54 to provide at least a friction fit therebetween and preferably a snap fit with the adapter 54. As is best shown in FIGS. 6 and 7, one of the retention fingers 130 is disposed above the other one of the retention fingers 132 enabling one of the retention fingers 130 to either engage the adapter 54 and/or be received in a corresponding recess 112 in the adapter 54 before the other one of the retention fingers 132 during adapter insertion. Positioning one of the retention fingers 130 above the other one of the retention fingers 132 also enables wiping element or squeegee clearance space 134 to be provided alongside the cradle 53 in which the wiping element 84 or squeegee 86 is received when the wiper blade 52 is packaged as shown in FIG. 7.

With continued reference to FIGS. 6 and 7, the upper adapter retention finger 130 has a downwardly obliquely angled inclined adapter guide surface 136 inclined downwardly into the cradle 53 that can slidably contact and guide part of the adapter 54 into the cradle 53 during insertion during packaging. The upper retention finger 130 also has a generally perpendicular adapter retaining surface 138 that preferably overlaps and is generally parallel to an inner wiper arm receiving receptacle defining surface 140 at or adjacent a respective top edge 110 of a corresponding adapter sidewall 98 providing an abutment or stop when the finger 130 is received in the wiper arm receptacle 112 that interferes with removal of the adapter 54 when the adapter is snapped into the cradle 53. As is best shown in FIG. 6, the upper retention finger 130 preferably has a V-shaped cross section with a nose 142 formed at an apex where the inclined guide and retaining surfaces 136, 138 converge.

The lower adapter retention finger 132 also has a downwardly obliquely angled inclined adapter guide surface 144 inclined downwardly into the cradle 53 that also can slidably contact and guide part of the adapter 54 into the cradle 53 during insertion during packaging. The lower retention finger 132 has an upwardly obliquely angled inclined adapter retaining surface 146 inclined upwardly at an acute angle relative to perpendicular that helps securely retain an adapter 54 snapped into the cradle 53 when the finger 132 is received in the adapter recess 104 adjacent the wiping element 84 with the upward inclination of the retaining surface 146 facilitating disengagement from the cradle 53 when it is desired to remove the wiper blade 52. As is also best shown in FIG. 6, the lower retention finger 132 preferably also has a V-shaped cross section with a nose 148 formed at an apex where the inclined guide and retaining surfaces 144, 146 converge.

As is shown in FIG. 7, when the adapter 54 of a wiper blade 52 has been snapped into the cradle 53, the retention fingers 130, 132 are respectively received in the top and bottom recesses 104, 112 of the adapter 54 thereby respectively releasably engaging the top 114 and bottom 106 of the adapter 53 removably yet securely retaining the adapter 54 in the cradle 53. When releasably engaged by and between the retention fingers 130, 132 of the cradle 53, the fingers 130, 132 not only releasably engage and releasably hold the adapter 54 substantially immovably in place in the cradle 53, but also can help releasably anchor the rest of the wiper blade 52 in the wiper blade receiving cavity 50. In a preferred package embodiment, releasable engagement between the retention fingers 130, 132 and a wiper blade adapter 54 received in the cradle 53 substantially completely releasably retains the entire wiper blade 52 in the wiper blade receiving cavity 50.

As is best shown in FIGS. 1 and 3-5, the cradle 53 can and preferably does include an elongate longitudinally extending adapter receptacle 150 formed in an upraised cover support 151 with the receptacle 150 having a generally oblong or oval shape that is substantially complementary to that of the oval shape of the adapter 53 to not only help securely yet releasably retain the adapter 53 in the cradle 53 but also to help longitudinally locate and/or position the blade arms 58a, 58b of the blade 52 within respective wiper blade receiving chambers 152a, 152b of the wiper blade receiving cavity 50 disposed on opposite sides of the cradle 53. The substantially complementary shape of the adapter cradle receptacle 150 with the wiper blade adapter 53 also helps orient the wiper blade 52 sideways within the wiper blade receiving cavity 50 as well as position each blade arm 58a, 58b so the blade arms 58a, 58b seat on or against a corresponding one of the blade arm seats 56a, 56b releasably retaining the blade 52 in a substantially straightened condition in the package 40.

With specific continued reference to FIG. 5, the adapter cradle receptacle 150 preferably is formed in the cover support 151 having a cradle bottom wall 154 from which upwardly extends a pair of spaced apart generally longitudinally extending elongate cradle sidewalls 156, 158 and a pair of generally transversely extending cradle endwalls 160, 162 with each cradle endwall 160, 162 having a wiper blade arm receiving and locating channel 164a, 164b formed therein that communicates with a respective wiper blade arm receiving chamber 152a, 152b of the wiper blade receiving cavity 50. As is best shown in FIGS. 6 and 7, the cradle bottom wall 154 can be angled and/or contoured, e.g., of curved cross-section, to generally conform to at least a portion of an adjacent sidewall 78 of the adapter 53 when the adapter 53 is received in the cradle 53. If desired, the cradle bottom wall 154 can have a plurality of spaced apart elongate cradle strengthening ribs 166 formed therein that can be generally parallel with one another that stiffen, strengthen and/or torsionally rigidify the cradle 53. A preferred cradle 53 is formed with at least a plurality of pairs, i.e., of such strengthening ribs 166 that help the cradle 53 to withstand forces transferred thereto from an adapter 54 received in the cradle 53 as a result of the tension produced by substantially straightening the wiper blade arms 58a, 58b seated in or on blade arm seats 56a, 56b.

As is best shown in FIG. 5, one of the cradle sidewalls 156 can be curved or have curved ends that curve not only to conform to the contour of the top 114 or bottom 106 of the wiper blade adapter 54 but also to respectively form at last a portion of a corresponding cradle endwall 160, 162 that brackets part of a corresponding adapter endwall 78, 80. In the preferred cradle embodiment shown in FIG. 5, cradle sidewall 156 is curved and/or has curved ends that conform to a substantially complementarily curved wiper blade adapter top 114.

As is also shown in FIG. 5, each cradle endwall 160, 162 can and preferably does terminate to form a respective side of each one of the wiper blade arm locating channels 164a, 164b with the opposite cradle sidewall 158 being substantially straight forming the other side of both blade arm locating channels 164a, 164b. With reference once again to FIGS. 5-7, one of the adapter retention fingers 130 extends from one of the cradle sidewalls 156 into the adapter cradle receptacle 150 and the other one of the adapter retention fingers 132 extends from the other one of the cradle sidewalls 158 into the cradle receptacle 150 generally inline with and towards the one of the adapter retention fingers 130. When the wiper blade adapter 54 is received in the cradle 53, the cradle sidewalls 156, 158 respectively bracket the top 114 and bottom 106 of the adapter 54 thereby preventing transverse movement of the adapter 54 relative to the blade retaining package panel 47 and the cradle endwalls 160, 162 respectively bracket corresponding adapter endwalls 78, 80 thereby preventing longitudinal movement of the adapter 54 relative to the blade retaining package panel 47 thereby releasably holding the adapter 54 and preferably the entire wiper blade 52 substantially in place.

With reference to FIGS. 1, 3 and 4, each blade arm locating channel 164a, 164b can extend adjacent to a corresponding blade arm seat 56a, 56b but preferably terminates well before them such that each channel 164a, 164b communicates with a respective blade arm receiving chamber 152a, 152b that can be and preferably is wider than the channels 164a, 164b to help facilitate wiper blade arm 58a, 58b insertion during packaging. Each blade arm receiving chamber 152a, 152b preferably is elongate and can be generally rectangular with one blade arm receiving chamber 152a disposed on one side of the adapter cradle 53 and the other blade arm receiving chamber 152b disposed on the other side of the adapter cradle 53.

With additional reference to FIGS. 8 and 9, each blade arm seat 56a, 56b is disposed within a corresponding blade arm receiving chamber 152a, 152b with each blade arm seat 56a, 56b having a blade arm seating surface 168 that can be generally planar against which part of the corresponding blade arm 58a, 58b adjacent the wiping element 84 abuts that is disposed at an angle that can be within 2°-35° of being right-angled relative to a wiping element support surface 170 that also can be generally planar upon which a side of the wiping element 84 adjacent the wiper blade beam 82 rests when the wiper blade 52 is received in the wiper blade receiving cavity 50. In a preferred seat embodiment, the blade arm seating surface of each blade arm seat 56a, 56b is generally right-angled relative to the wiping element support surface such that the narrowed squeegee edge or wiping element tip 86 of the wider wiping element 84 is spaced from any adjacent part of the blade retaining package panel 47 including package base sidewall 70. By each blade arm seat 56a, 56b ensuring there is a space or gap between the outer squeegee edge or wiping element tip 86 and the package 40, the integrity of the edge or tip 86 is maintained while the wiper blade is packaged in the closed package 40.

With reference once again to FIGS. 1, 3 and 4, package base sidewalls 68, 70 form portions of respective sidewalls of the wiper blade receiving cavity 50 and package base endwalls 72, 74 each form a corresponding endwall of the wiper blade receiving cavity 50. In the preferred reclosable wiper blade package embodiment shown in the drawings, portions of the package base sidewalls 68, 70 form corresponding sidewalls of each blade receiving chamber with one package base endwall 72 forming one endwall of one blade receiving chamber 152b and the other package base endwall 74 forming the other endwall of the other blade receiving chamber 152a.

As is also shown in FIGS. 1, 3, 4, and 6-9, one wiper blade arm seat 56a is upraised and integrally formed of one portion of the blade retaining package panel floor 126 on one side of the adapter cradle 53 and the other blade arm seat 56b is upraised and integrally formed of another portion of the blade retaining package panel floor 126 on the other side of the adapter cradle 53. To accommodate a sideways oriented wiper blade 52, the blade arm seating surface 168 of each blade arm seat 56a, 56b extends generally vertically upwardly and the wiper blade wiping element support surface 170 extends generally transversely relative to the blade arm seating surface 168. In the preferred reclosable wiper blade package embodiment shown in the drawings, the wiping element support surface 170 of each blade arm seat 56a, 56b is generally perpendicular to the blade arm seating surface 168 and can extend generally horizontally as depicted in FIGS. 6-9.

With reference to FIGS. 1, 3, 4 and 8-9, each one of the package base sidewalls 68, 70 and each one of the package base endwalls 72, 74 are respectively formed of an elongate rib 60, 62, 64, 66 that each have an elongate rib outer wall or rib endwall 172 from which a pair of spaced apart rib sidewalls 174, 176 outwardly extend defining a generally V-shaped or U-shaped rib cross-section. Forming one or more and preferably at least a plurality of the package base sidewalls 68, 70 and/or endwalls 72, 74 from such a rib construction increases the strength, stiffness and flexural rigidity of the package base 48 as well as the wiper blade receiving cavity 50 helping a closed package 40 (FIGS. 2, 8 and 9) to better withstand force(s) applied thereto including by the substantially straightened beam-type wiper blade 52 in the package 40 even when the package 40 is subjected to external bending and/or twisting forces.

To help further strengthen and/or stiffen at least a plurality of the sidewalls 68, 70 and endwalls 72, 74 of the package base 48, at least a plurality of the package base sidewalls 68, 70 and endwalls 72, 74 have a plurality of rib-reinforcing gussets 76 formed in sidewall and/or endwall defining ribs 60, 62, 64, and/or 66 with each gusset 76 composed of a constriction 178 formed in the rib where the width of the rib is narrowed or reduced to a width less than the rib width on either side of the gusset 76. The ribs 60 and 62 forming corresponding package base sidewalls 68, 70 each have at least a plurality of spaced apart gussets 76 formed therein and can have a plurality of pairs, i.e., at least three, gussets 76 formed therein as depicted in FIGS. 1, 3 and 4.

FIGS. 10-12 show an enlarged section of a portion of rib 60 having one of the gussets 76 formed in the rib 60 that forms part of the package half wall 68 which, in the reclosable package embodiment shown in the drawings, is part of the package base 48 of the reclosable package 40. Each gusset 76 is formed of a constriction 178 in the rib 60 that forms a reduced rib thickness section of webbing 180 where the separation or spacing between the rib sidewalls 174, 176 is reduced thereby reducing a width, $W_1$, of the rib 60 immediately below the gusset 76 to a width, $W_2$, at a root 182 of the gusset 76 that is less than the width, $W_1$, of the rib 60. In the preferred embodiment shown in FIGS. 10-12, the root 182 of the gusset 76 is located below where the constricted rib sidewalls 174, 176 separate from one another forming a rounded margin 184 surrounding or encircling the webbing 180 of the gusset 76 with the margin 184 being disposed between the webbing 180 of the gusset 76 and the rest of the rib 60. The rounded margin 184 not only helps strengthen the rib 60 along and around the webbing 180 of the gusset 76 but the margin 184 also helps oppose torsion, twisting and/or bending moments originating at or along the gusset 76. Such a rounded or smooth margin 184 also opposes and preferably substantially completely prevents crack formation in the region of the webbing 180 of the gusset 76 when the rib 60, including the gusset 76, when subjected to stress, stretching, twisting, torsion and/or bending forces.

As is also shown in FIGS. 10-12, the webbing 180 of the gusset 76 is formed with the rib sidewalls 174', 176' overlapping one another preferably in contact with one another throughout and along substantially the entire webbing 180 of the gusset 76. The overlapping webbing forming rib sidewalls 174', 176' are plastically deformed, preferably during thermoforming of the package 40 forming a gusset webbing 180 that is not only relatively stiff, opposing separation of the constricted overlapping gusset webbing rib sidewalls 174', 176' but which thereby also stiffens portions 60', 60" of the rib 60 on either side of the gusset 76 by opposing separation of the spaced apart rib sidewalls 174, 176 on either side of the gusset 76. This allows for formation of the structurally strengthening gussets 76 while at the same time minimizing the amount of plastic needed. The gusseted ribs 60 thereby provide greater structural rigidity as they oppose a force spreading the rib sidewalls 174', 176' and 174, 176 apart, due in part to the curvature as well as the gussets 76.

The webbing 180 of each gusset 76 is not only formed of a width constricted section of the rib 60 where the spacing between rib sidewalls 174', 176' is reduced including so as to overlap one another, the rib endwall 172' is also constricted such that the webbing 180 forms a recess 186 in the rib endwall 172 reducing the height, $H_1$, of the rib 60 to a height, $H_2$, less than the rib height, $H_1$, of the portions 60', 60" of the rib 60 on either side of the gusset 76. The gusset webbing recess 186 can be generally U-shaped or V-shaped as is shown in FIGS. 10 and 12. The outer edge 188 of the webbing 180 of each gusset 76 can be generally flat as shown in solid in FIG. 13 or have a knife edge 188' as shown in phantom in FIG. 13.

With continued reference to FIGS. 10-13, in one preferred embodiment, one or both package halves 42, 44 can have gussets 76 thermoformed with the webbing 180 of each gusset 76 having a cross-section thickness or width, $W_2$, less than two-thirds of the width, $W_1$, of the portions 60', 60" of the rib 60 on either side of the gusset 76. In another preferred embodiment, one or both package halves 42, 44 have gussets 76 with the webbing 180 of each gusset 76 having a thickness or width, $W_2$, less than half the width, $W_1$, of the portions 60', 60" of the rib 60 on either side of the gusset 76. Such gussets 76 can each have a webbing 180 with a thickness of about two times rib sidewall thickness and preferably not more than 2.5 times rib sidewall thickness. While the webbing 180 of each gusset 76 preferably is formed by plastically deforming and constricting the rib sidewalls 174, 176 and/or rib endwall 172 together reducing rib height and the spacing between the rib sidewalls 174', 176' such that the rib sidewalls 174', 176' can even overlap one another remaining in contact with each other once the gusset 76 is formed, such as is depicted in FIGS. 10-13, the rib sidewalls 174', 176' can also be fused together, e.g., melted together, such as is depicted by the gussets 76 shown in FIG. 9, if desired.

With specific reference to FIG. 11, the constriction 178 that forms the webbing 180 of each gusset 76 is formed by a pair of arcuate or scalloped indentations 190', 190" formed in opposite rib sidewalls 174, 176. With continued reference to FIG. 11, the webbing 180 of each gusset 76 preferably has a length, L, which is at least equal to or greater than the width, $W_1$ of FIG. 13, of the rib 60. In one preferred gusset embodiment, the webbing 180 of each gusset 76 has a length, L, between one and three times the width, $W_1$, of the rib 60. In another preferred gusset embodiment, the webbing 180 of each gusset 76 has a length, L, of at least 1.5 times the width, $W_1$, of the rib 60 and preferably between 1.5 and 2.5 times the width, $W_1$, of the rib 60. In still another preferred gusset embodiment, the webbing 180 of each gusset 76 has a length, L, between 1.5 and 3 times the width, $W_1$, of the rib 60. In a further preferred gusset embodiment, the webbing 180 of each gusset 76 has a length, L, of at least 2 times the width, $W_1$, of the rib 60 and preferably between 2 and 3.5 times the width, $W_1$, of the rib 60. In still another preferred gusset embodiment, the webbing 180 of each gusset 76 has a length, L, between 1.5 and 3 times the width, $W_1$, of the rib 60.

In a still further preferred embodiment, the gussets 76 each have a webbing 180 with a thickness of about two times rib sidewall thickness and preferably not more than 2.5 times rib sidewall thickness. While the webbing 180 of each gusset 76 preferably is formed by plastically deforming and constricting the rib sidewalls 174, 176 and/or rib endwall 172 together reducing rib height and the spacing between the rib sidewalls 174', 176' such that the rib sidewalls 174', 176' can even overlap one another in contact with each other, such as is depicted in FIGS. 10-13, the rib sidewalls 174', 176' can even be fused together, e.g., melted together, such as is depicted by the gussets 76 shown in FIG. 9.

With reference to FIGS. 1-9, a reclosable package 40 constructed in accordance with the present invention has a closure arrangement 192 formed of a plurality of spaced apart closures 194 and 196 constructed and arranged to produce releasable yet positive secure engagement between the package halves 42, 44 enabling the cover 43 of one package half 42 to remain securely closed and engaged with the package base 48 of the other package half 44. One of the package closures 194 is formed of at least a plurality of side snaps 198 each formed of a side snap bar 200 integrally formed in one of a sidewall or side-forming flange of one of the package halves 42, 44 that is received in a recessed side snap bar receiver 202 integrally formed in one of a sidewall or side-forming flange of the other one of the package halves 42, 44. The other one of the package closures 196, shown best in FIGS. 15-17, is formed of at least a plurality of corner snaps 199 each formed of a corner snap bar 204 integrally formed in one of a corner of a sidewall or side-forming flange of one of the package halves 42, 44 that is received in a recessed corner snap bar receiver 206 integrally formed in one of a corner of a sidewall or side-forming flange of the other one of the package halves 42, 44.

With specific reference to FIGS. 1-4, 8 and 14-16, each sidewall 116, 118 of the cover 43 of package half 42 has a plurality of generally horizontally extending elongate or oblong longitudinally spaced apart snap bars 200 formed therein that each extend outwardly towards a corresponding one of the sidewalls 68, 70 of the blade retaining package panel 47 or base 48 of the other package half 44 when the package 40 is closed with each snap bar 200 received in a respective one of a plurality of generally horizontally extending elongate or oblong longitudinally spaced apart recessed snap bar receivers 202 formed therein helping to releasably keep the cover 43 closed. In a preferred embodiment, each endwall 120, 122 of the cover 43 of one package half 42 also has a generally horizontally oriented elongate or oblong snap bar 200 formed therein that extends outwardly towards a corresponding generally horizontally oriented elongate or oblong recessed snap bar receiver 202 formed in a respective endwall 72, 74 of the blade retaining package panel 47 or base 48 of the other package half 44. When the package 40 is closed, horizontally extending side snaps 198 are spaced apart about all four sides of the package 40 about the entire periphery of the package 40 when closed helping to releasably yet securely keep the package 40 closed.

Figure 15:
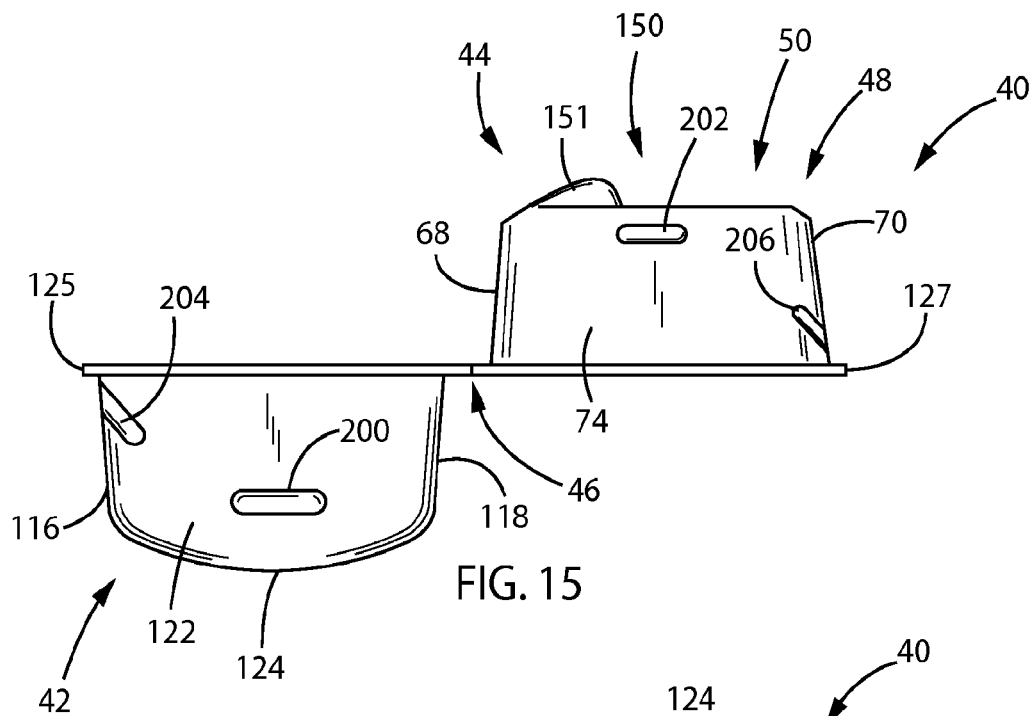
FIG. 15 illustrates a side view of the empty reclosable wiper blade package in an open position according to FIG. 1.
Figure 16:
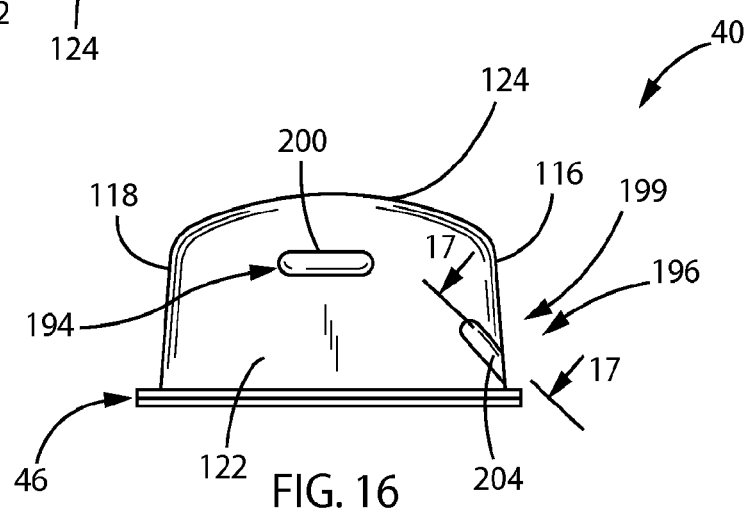
FIG. 16 illustrates a side view of the empty reclosable wiper blade package in a closed position according to FIG. 2.
Figure 17:
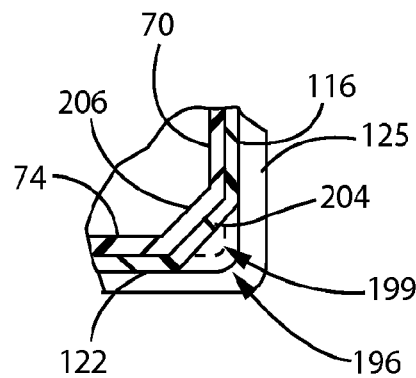
FIG. 17 illustrates a close up, partial view of the empty reclosable wiper blade package in a closed position according to FIG. 16 along line 17:17.

Turning to FIGS. 15-17, package closures 196 are formed of at least a plurality of corner snaps 198 each formed of a corner snap bar 204 integrally formed in one of a corner of a sidewall or side-forming flange of one of the package halves 42, 44 that is received in a recessed corner snap bar receiver 206 integrally formed in one of a corner of a sidewall or side-forming flange of the other one of the package halves 42, 44.

The corner snap bar 204 and corner snap bar receiver 206 are formed equally and opposite of each other, or mirror images, such that the corner snap bar 204 protrudes towards the inner portion of a package half 42 and the corner snap bar receiver 206 protrudes from the other package half 44 towards the receiving cavity 50. The directions that both the corner snap bar 204 and corner snap bar receiver 206 protrude allow them to join one another with a snap fit, as they are sized with a close tolerance to keep the package halves 42, 44 closed and pressed together.

The corner snap bar receiver 206 is formed at an angle, approximately forty five degrees from the package panel flange 127. Likewise, the corner snap bar 204 is formed at a similar angle, approximately forty five degrees from the cover flange 125. The exact angle for either is not critical so long as they match one another allowing the corner snap bar 204 and the corner snap bar receiver 206 to nest with one another when the package halves 24, 44 are closed. The corner snaps 198 therefore resist not only a prying force separating the package halves 24, 44, but also resists a twisting force applied to the closed wiper blade package 40. Also, the angled orientation of the corner snaps 198 allows them to resist forces in both a horizontal plane as well as a vertical plane.

Referring primarily to FIG. 17, it shows a cross sectional view along the corner snap 198 of FIG. 16. The indentation, or protrusion of the corner snap bar 204 and corner snap bar receiver 206 form a pocket into the corner of the cover 43 and corner of the base 48 allowing a finger or fingernail to be inserted and pry the cover open.

With respect to FIG. 18, the hinge 46 is shown with the flanges 125, 127 forming a common line as the package is open, as shown in FIG. 1. FIG. 19 shows the same hinge 46, but with the package 40 in a closed position. The hinge 46 joins the cover sidewall 118 to the base sidewall 68 along their respective flanges 125, 127. The hinge 46 allowing one package half 43 to pivot about the hinge 46 in order to close the package 40. As best shown in FIG. 5, the hinge 46 is preferably scored, or perforated, along its length creating a perforated hinge 46 having alternating scores 210 and connected sections 212 forming a bend or fold line 214 along which the cover 43 pivots during closure of the package 40 that provides less resistance to package closure. Additionally, the scores 210 formed along the bend or fold line 214 of the hinge 46 minimizes the amount of interconnected material between the package halves 42, 44 needed to flex. This minimizes spring-back of the cover open when the package 40 is closed. The result of the scored hinge 46 is that when the package 40 is closed, it remains closed. Also, the flanges 127, 125 may be formed of less thickness which enables a greater amount of packages 40 to be stacked on one another, reducing the total height of a stack when packaging multiple packages for shipping or storage purposes.

With reference to FIGS. 1-5, the cover support 151 of the cradle 53 of the package base 48 has a curved contour as best shown in FIG. 15 that is complementarily curved to substantially conform to at least a portion of the curvature of the curved outer wall 124 of the package cover 43. To help strengthen the cover 43, the cover 43 has a diagonally extending rib 216 that registers or is received in a diagonally extending channel 218 formed in the cover support 151 when the cover 43 is closed. When the cover 43 is closed, the rib 216 formed in the cover 43 not only strengthens the cover 43, by also the package base 48 thereby strengthening and structurally rigidifying the entire package 40.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A reclosable wiper blade package in combination with a wiper blade comprising:
   a. an elongate pre-curved beam-blade wiper blade having a pair of elongate blade arms extending oppositely outwardly from a wiper blade mounting adapter;
   b. a reclosable wiper blade package comprised of a pair of package halves joined by a hinge with one of the package halves comprising a cover and the other one of the package halves comprising a blade-retaining package panel having a blade-receiving cavity formed therein configured to receive and releasably retain the wiper blade; and
   wherein the blade-retaining package panel has an elongate rib formed therein with the rib having (a) a pair of spaced apart rib sidewalls extending outwardly from a rib endwall and (b) a plurality of longitudinally spaced apart rib strengthening gussets integrally formed of an adjacent portion of the rib sidewalls extending transversely therebetween.

2. The reclosable package and wiper blade combination of claim 1 wherein the blade-retaining package panel is formed to provide snap-fit engagement with the adapter when the wiper blade is received in the blade-receiving cavity releasably and retaining the wiper blade in the blade-receiving cavity.

3. The reclosable package and wiper blade combination of claim 2 wherein the wiper blade has an elongate flexible wiping element extending outwardly from the blade arms substantially the length of the wiper blade from at or adjacent a free end of one of the blade arms to at or adjacent a free end of the other one of the blade arms, the elongate flexible wiping element having an elongate outer squeegee edge, and wherein the blade-receiving cavity receives and releasably retains the wiper blade sideways in a substantially straightened condition with an outer wiping element tip extending outwardly away from the hinge when the adapter of the wiper blade is disposed in snap-fit engagement with the blade-retaining package panel.

4. The reclosable package and wiper blade combination of claim 1 wherein the blade-retaining package panel has a pair of oppositely extending adapter-retainer fingers formed therein extending outwardly toward one another releasably capturing the adapter therebetween when the wiper blade is received in the blade receiving cavity releasably retaining the wiper blade in the cavity.

5. The reclosable package and wiper blade combination of claim 4 wherein the wiper blade is disposed in a substantially straightened condition when received in the blade-receiving cavity with the adapter of the wiper blade releasably captured between the adapter retainer fingers releasably retaining the wiper blade in the blade-receiving cavity.

6. The reclosable package and wiper blade combination of claim 5 wherein the blade-retainer fingers provide snap-fit engagement with the adapter when releasably captured between the blade-retainer fingers.

7. The reclosable package and wiper blade combination of claim 4 wherein the wiper blade is received in the blade-receiving cavity disposed on a side of the wiper blade when received in the blade-receiving cavity with the adapter of the wiper blade releasably captured between the adapter retainer fingers releasably retaining the wiper blade in the blade-receiving cavity.

8. The reclosable package and wiper blade combination of claim 4 wherein (a) the adapter has a top configured for mounting to a reciprocating vehicle windshield wiper arm and a bottom from which the pair of elongate blade arms oppositely outwardly extend, and (b) one of the adapter-retainer fingers engages the top of the adapter and the other one of the adapter-retainer fingers engages the bottom of the adapter when the wiper blade is received in the blade-receiving cavity.

9. The reclosable package and wiper blade combination of claim 4 wherein (a) the adapter has a top configured for mounting to a reciprocating vehicle windshield wiper arm with the adapter top having a top recess formed therein and a bottom from which the pair of elongate blade arms oppositely outwardly extend with the adapter bottom having a bottom recess formed, and (b) one of the adapter-retainer fingers is received in the top recess formed in the top of the adapter and the other one of the adapter-retainer fingers is received in the bottom recess formed in the bottom of the adapter when the wiper blade is received in the blade-receiving cavity and the adapter releasably captured between the adapter-retainer fingers.

10. The reclosable package and wiper blade combination of claim 1 further comprising an adapter cradle formed in the blade-retaining package panel having a pair of oppositely outwardly and longitudinally extending blade arm locator channels which each receive part of a corresponding blade arm adjacent the adapter of the wiper blade when the adapter is received in the adapter cradle orienting the blade arms longitudinally within a respective longitudinally extending elongate blade-arm receiving chamber of the blade-receiving cavity in communication with the blade arm locator channel.

11. The reclosable package and wiper blade combination of claim 10 wherein each blade arm locator channel is wider in width than the respective blade arm received therein but narrower in width than the corresponding blade arm receiving chamber in communication therewith.

12. The reclosable package and wiper blade combination of claim 11 wherein (a) the wiper blade has an elongate flexible wiping element extending outwardly from the blade arms substantially the length of the wiper blade from at or adjacent a free end of one of the blade arms to at or adjacent a free end of the other one of the blade arms with the wiping element having an elongate squeegee edge, and (b) each blade arm receiving chamber of the blade-receiving cavity has an upraised blade arm-receiving platform with a blade arm abutment against which part of the respective blade arm received in the corresponding blade arm receiving chamber abuts and a wiping element support upon which part of the wiping element of the respective blade arm received in the corresponding blade arm receiving chamber rests.

13. The reclosable package and wiper blade combination of claim 12 wherein the wiper blade is releasably retained in a substantially straightened condition when the adapter of the wiper blade is received in the adapter cradle, and each wiper blade arm is received in a corresponding blade arm locator channel and seated against a respective blade arm-receiving platform.

14. The reclosable package and wiper blade combination of claim 1 wherein (a) the wiper blade has an elongate flexible wiping element extending outwardly from the blade arms substantially the length of the wiper blade from at or adjacent a free end of one of the blade arms to at or adjacent a free end of the other one of the blade arms with the wiping element having an elongate squeegee edge, and (b) the blade-receiving cavity has a pair of oppositely spaced apart upraised blade arm-receiving platforms each having a blade arm abutment against which part of a respective blade arm abuts and a wiping element support upon which part of the wiping element of a respective blade arm rests.

15. The reclosable package and wiper blade combination of claim 14 wherein each blade arm-receiving platform is generally right angled with the blade arm abutment disposed generally perpendicular to the wiping element support.

16. The reclosable package and wiper blade combination of claim 15 wherein the wiping element support is generally planar and generally parallel with part of the wiping element supported thereon when part of a corresponding blade arm is seated on the blade arm-receiving platform and wherein the blade arm abutment is generally planar and generally parallel with part of the blade arm in abutment therewith when part of the corresponding blade arm is seated on the blade arm-receiving platform.

17. The reclosable package and wiper blade combination of claim 16 wherein the wiper blade is releasably retained in a substantially straightened condition when the wiper blade is received in the blade-receiving cavity with each wiper blade arm seated on a respective blade arm-receiving platform.

18. The reclosable package and wiper blade combination of claim 1 wherein each rib gusset forms a recess in the rib endwall.

19. The reclosable package and wiper blade combination of claim 18 wherein each rib gusset forms a generally V-shaped or U-shaped notch in the rib endwall.

20. The reclosable package and wiper blade combination of claim 1 wherein each rib gusset has a generally V-shaped transverse cross-section.

21. The reclosable package and wiper blade combination of claim 1 wherein each rib gusset comprises a constricted portion of the rib having a transverse cross-sectional width less than the width of the rib.

22. The reclosable package and wiper blade combination of claim 21 wherein each rib gusset forms a recess in the rib endwall.

23. The reclosable package and wiper blade combination of claim 22 wherein each rib gusset forms a generally V-shaped or U-shaped notch in the rib endwall.

24. The reclosable package and wiper blade combination of claim 21 wherein each rib gusset has a generally V-shaped transverse cross-section.

25. The reclosable package and wiper blade combination of claim 21 wherein the constricted portion of the rib forming each rib gusset comprises a segment of the rib where the rib sidewalls are not spaced apart.

26. The reclosable package and wiper blade combination of claim 21 wherein the constricted portion of the rib forming each rib gusset is comprised of a segment of the rib where the rib sidewalls are pinched together.

27. The reclosable package and wiper blade combination of claim 21 wherein the constricted portion of the rib forming each rib gusset is comprised of a segment of the rib where the rib sidewalls are plastically deformed together.

28. The reclosable package and wiper blade combination of claim 21 wherein the constricted portion of the rib forming each rib gusset is comprised of a segment of the rib where the rib sidewalls are plastically deformed and pinched together.

29. A reclosable wiper blade package in combination with a wiper blade comprising:
   a. an elongate wiper blade having a pair of elongate blade arms extending oppositely outwardly from a wiper blade mounting adapter;
   b. a reclosable wiper blade package comprised of a pair of package halves joined by a hinge with one of the package halves comprising a cover and the other one of the package halves comprising a blade-retaining package panel having a blade-receiving cavity formed therein configured to receive and releasably retain the wiper blade; and
   wherein the blade-retaining package panel has an elongate rib formed therein with the rib having (a) a pair of spaced apart rib sidewalls extending outwardly from a rib endwall and (b) a plurality of longitudinally spaced apart longitudinally extending gussets integrally formed of a segment of the rib sidewalls in contact with each other producing a constriction in the rib having a transverse width less than the width of the rib on either side of the gusset.

30. The reclosable package and wiper blade combination of claim 29 wherein the elongate rib with gussets forms part of the blade-receiving cavity integrally formed in the blade-retaining package panel.

31. The reclosable package and wiper blade combination of claim 30 wherein the elongate rib with gussets extends longitudinally along one side of the blade-receiving cavity generally parallel to the hinge.

32. A reclosable wiper blade package in combination with a wiper blade comprising:
   a. an elongate wiper blade having a pair of elongate blade arms extending oppositely outwardly from a wiper blade mounting adapter;
   b. a reclosable wiper blade package comprised of a pair of package halves joined by a hinge with one of the package halves comprising a cover and the other one of the package halves comprising a blade-retaining package panel having a blade-receiving cavity formed therein configured to receive and releasably retain the wiper blade; and
   wherein the blade-retaining package panel has an elongate rib formed therein with the rib having (a) a pair of spaced apart rib sidewalls extending outwardly from a rib endwall defining a rib of generally U-shaped or V-shaped transverse cross-section and (b) a plurality of longitudinally spaced apart longitudinally extending gussets integrally formed of rib sidewalls plastically deformed and pinched together producing a constriction in the rib having a transverse width less than the width of the rib on either side of the gusset and defining a generally U-shaped or V-shaped recess or notch in the rib endwall.

33. The reclosable package and wiper blade combination of claim 32 wherein the elongate rib extends longitudinally generally parallel to the hinge.

34. The reclosable package and wiper blade combination of claim 33 wherein the elongate rib forms a sidewall of the blade-retaining cavity.

\* \* \* \* \*